(12) United States Patent
Stull

(10) Patent No.: US 6,702,343 B1
(45) Date of Patent: Mar. 9, 2004

(54) AUTOMOTIVE GRILLE

(76) Inventor: William S. Stull, 1399 Hidden Springs Dr., Corona, CA (US) 91721

( * ) Notice: Subject to any disclaimer, the term of this patent is extended or adjusted under 35 U.S.C. 154(b) by 0 days.

(21) Appl. No.: 10/287,321

(22) Filed: Nov. 2, 2002

(51) Int. Cl.[7] .............................................. B62D 25/08
(52) U.S. Cl. ........................ 293/115; 180/68.6; 427/258
(58) Field of Search .......................... 293/115; 180/68.6; 427/258

(56) References Cited

U.S. PATENT DOCUMENTS

| 3,152,950 A | 10/1964 | Palmquist et al. |
| 4,351,864 A | 9/1982 | Giannakidis |
| 4,403,004 A | 9/1983 | Parker et al. |
| 5,487,575 A | 1/1996 | Chase |
| 5,695,228 A | 12/1997 | Storer |
| 6,027,150 A | 2/2000 | Flewitt et al. |
| 6,206,438 B1 | 3/2001 | Pueyo |

*Primary Examiner*—Joseph D. Pape
(74) *Attorney, Agent, or Firm*—Knobbe, Martens, Olson & Bear, LLP

(57) ABSTRACT

An improved automotive grille and an improved method of making the automotive grille are provided. The automotive grille is built from aluminum and subsequently powder coating. Multiple stainless steel strips are adhered to the leading edge of the grille, thereby reducing moisture within the powder coating and improving the decorative appearance of the grille.

18 Claims, 7 Drawing Sheets

AUTOMOTIVE GRILLE

BACKGROUND OF THE INVENTION

1. Field of the Invention

The preferred embodiments of the present invention relate to automotive grilles.

2. Description of the Related Art

Automotive grilles are used as a barrier to protect an automobile's radiator as well as serve as a decorative feature. The grille generally serves as a source of ventilation to the radiator. The grille also provides decorative features which improve the look and style of an automobile.

The grilles protect the radiator from a number of objects, such as bugs, rocks, and road debris, which may damage the radiator and the grille. The grilles are often pitted or dented by the impact of these objects, resulting in an undesirable decorative finish. Furthermore, the grilles may be subject to significant impact forces during collisions. Moreover, certain materials and methods of making the grille result in rusting of various parts of the grille or flaking off of coating materials. Rusting adversely effects the decorative finish of the grill and contributes to decreased strength over an extended period of time. Flaking off of the powder coating also reduces the quality of the decorative finish of the grille, and provides no barrier to the grille base material.

A number of these automotive grilles are built from aluminum. A powder coating, or other similar, coating is typically applied to the entire grille, and the leading edge of the grille may be polished thereby removing the powder coating on the leading edge to obtain a decorative finish. Other automotive grilles are made from a high-impact plastic and then coating with a metallic coating, such as chrome plating.

However, there are several problems associated with polishing the grille after powder coating and applying a metallic coating. For example, the aluminum may become tarnished, and moisture can get beneath the powder coating at the edges, resulting in flaking off of the powder coating or metallic coating and rusting.

A variety of grilles exist employing different shapes, materials, and finishes to provide some of these needs. However, none provide adequate strength, while also providing a superior decorative finish that lasts for an extended period of time.

Accordingly, an improved automotive grille is required having the decorative features of a conventional grille, but also overcoming the problems associated with conventional manufacturing techniques.

SUMMARY OF THE INVENTION

The aforementioned needs are satisfied by the automotive grill assembly of the present invention which, in one aspect, comprises a grill assembly having a substrate material which defines an exposed front face. The substrate is coated with a protective coating such that the exposed front face is also coated. A decorative protective layer is then adhered to the exposed front face such that the protective coating is interposed between the decorative protective layer and the substrate. By adhering the decorative protective layer to the protective coating on the front face, the tendency of the protective coating to flake off on surfaces adjacent the front face is reduced. Adhering the decorative protective layer can be accomplished using any of a number of different techniques, including using an epoxy or the like.

In one implementation, the coating material comprises a powder coating that is uniformly applied to the exterior surfaces of the substrate including the front face of the substrate. The decorative layer is preferably formed of a tarnish and damage resistant material such as stainless steel. By positioning stainless steel on the exposed front face of the grill, a harder material that is less susceptible to damage as a result of hitting road debris is positioned on the front face of the grill. This reduces the tendency of the grill's appearance to degrade over time.

In one implementation, the substrate comprises an aluminum substrate and the protective coating comprises a powder coating, a wet paint substance or anodizing. Again, by interposing any one of these materials between the decorative protective layer and the substrate results in the protective coating having fewer exposed edges at the interface between the front decorative face and an adjacent surface of the substrate. This further reduces the tendency of the protective coating to chip or peel off over time. In another implementation, a chrome plate material is positioned on a stainless steel substrate or the chrome plate material is positioned on the decorative protective layer to enhance the appearance of the decorative protective layer.

The grill assembly of the present invention provides an assembly that is less likely to tarnish over time and is more resistant to damage or flaking of coatings on the substrate. These and other objects and advantages of the present invention will become more apparent from the following description taken in conjunction with the accompanying drawings.

DETAILED DESCRIPTION OF THE PREFERRED EMBODIMENT

Certain preferred embodiments of the present invention described herein provide for an automotive grille and a method of making the automotive grille.

Figure 1:
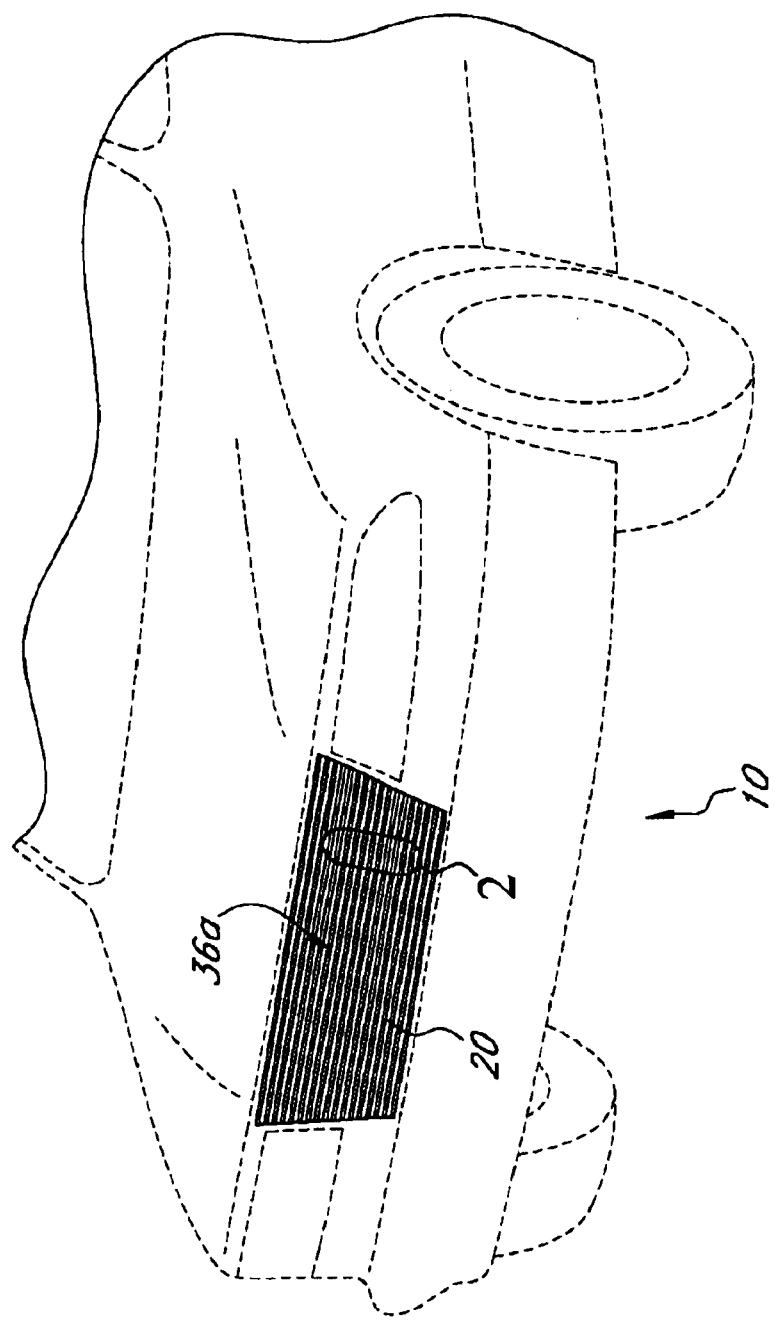
FIG. 1 is a perspective view of an automotive grille positioned at the front end of an automobile in accordance with a preferred embodiment of the present invention.

With reference to FIG. 1, the front end of an automobile 10 is shown having a decorative automotive grille 20 positioned therein. The grille is mounted to the forward edge of an engine hood, and may be suspended over a front bumper. The grille is preferably mounted to be flush with its surrounding automobile body panel structure, such that the bumper, hood and grille are aligned as shown in FIG. 1. It is envisioned that the grille may be used with any automobile or automobile body panel structure adapted to receive an automotive grille.

The grille 20 has an exterior or front surface 36a, visible from the front end of the automobile. The front surface defines the decorative surface of the grille. The grille also has an oppositely disposed interior or rear surface which faces the engine compartment of the automobile.

Figure 2:
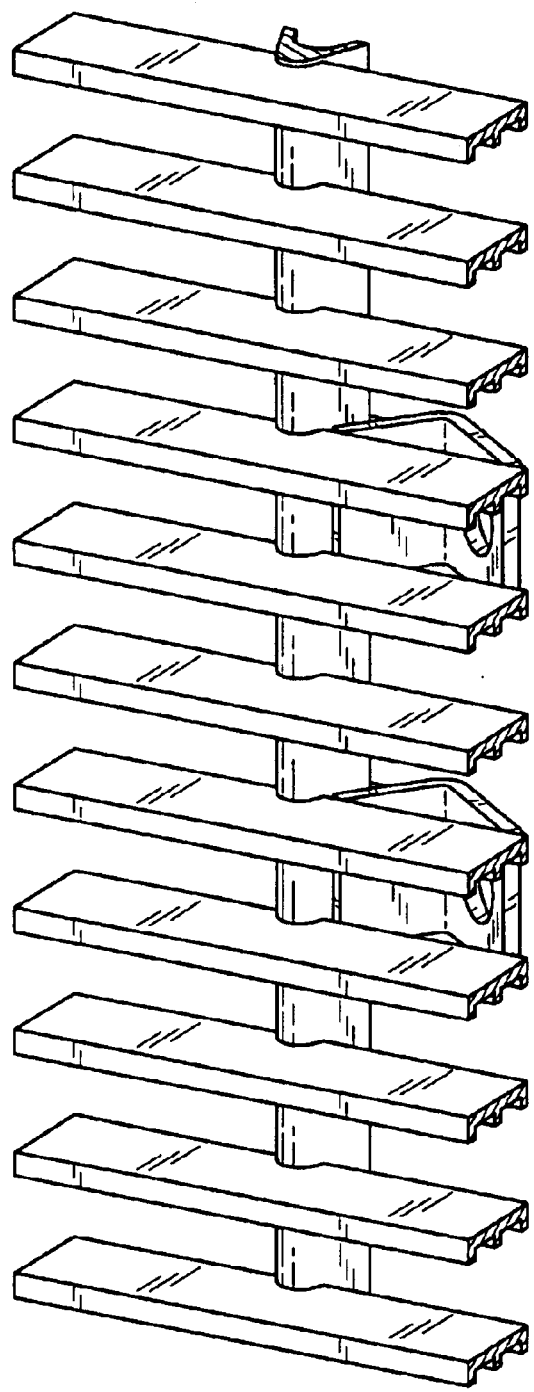
FIG. 2 is a perspective view of a cutaway section of the automotive grille of FIG. 1.
Figure 3:
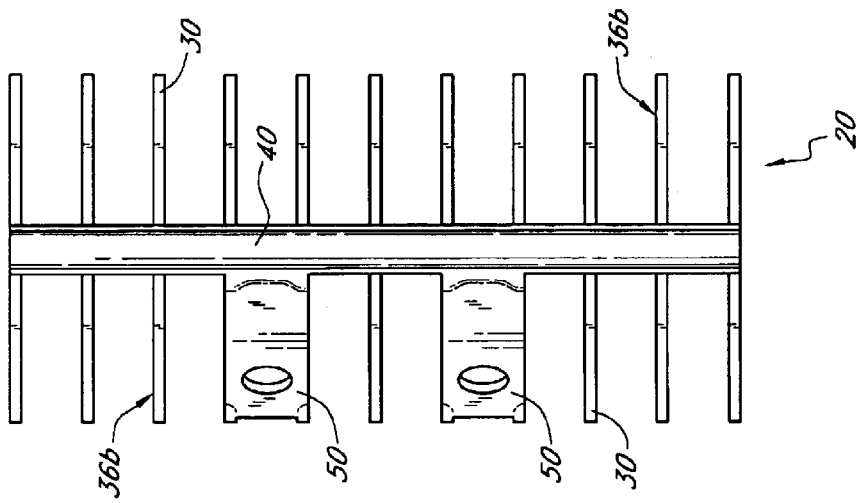
FIG. 3 is a front view of a cutaway section of the automotive grille of FIG. 1.
Figure 4:
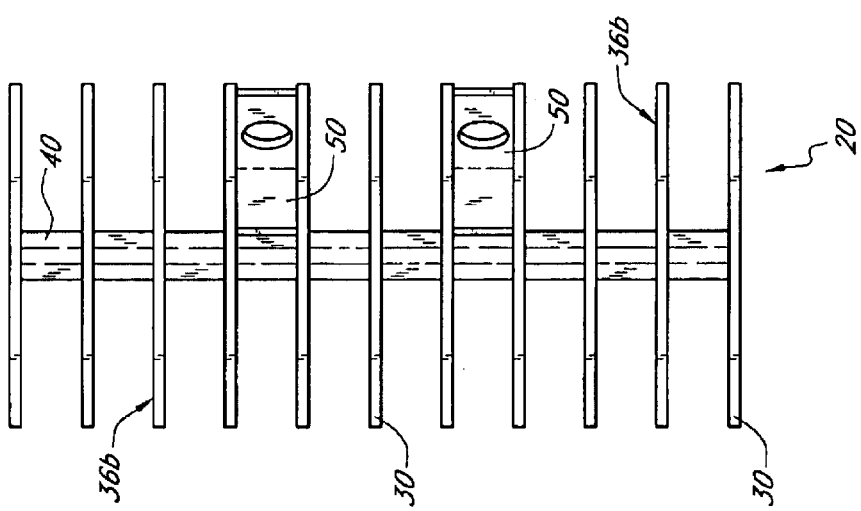
FIG. 4 is a back view of a cutaway section of the automotive grille of FIG. 1.
Figure 5:
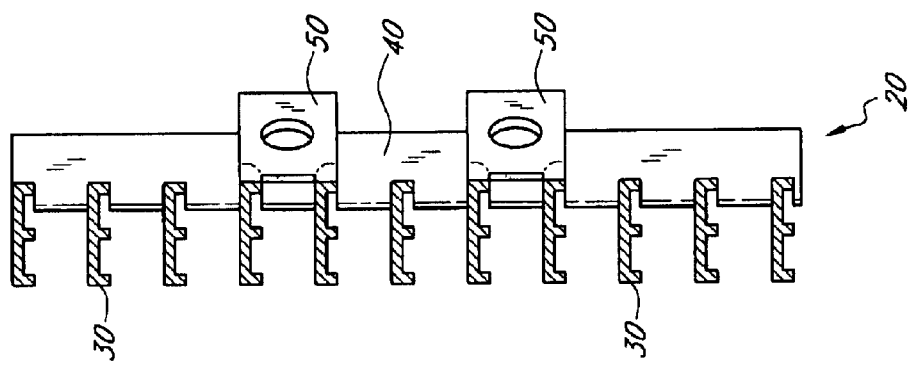
FIG. 5 is a side view of a cutaway section of the automotive grille of FIG. 1.

A cut-away section of the grille is shown in FIGS. 2–8 to better show the features of the grille 20. As shown in FIGS. 2–5, the cutaway section is shown from a variety of angles: FIG. 2 is a perspective view, FIG. 3 is a front view, FIG. 4 is a back view, and FIG. 5 is a side view. As can be seen from these views, vehicle grille has a structure having a first and second side defining the front and rear surfaces.

The structure includes a plurality of horizontally extending slats which form the decorative members 30 of the grille. The decorative members 30 include a plurality of exposed surfaces and a plurality of front faces adjacent the first side of the structure.

Figure 6:
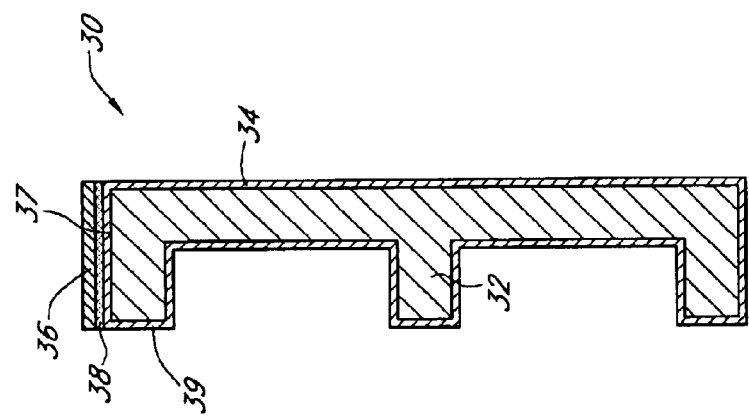
FIG. 6 is a detailed cross sectional view of the automotive grille of FIG. 4 showing the substrate having square edges.
Figure 8:
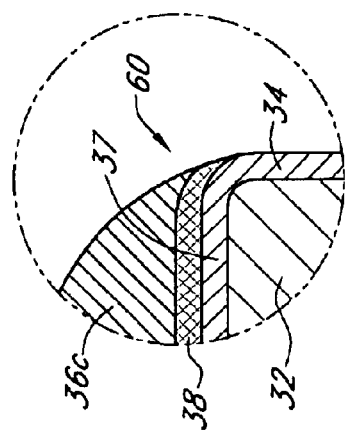
FIG. 8 is a detailed cross sectional view of the automotive grille of FIG. 7.
Figure 7:
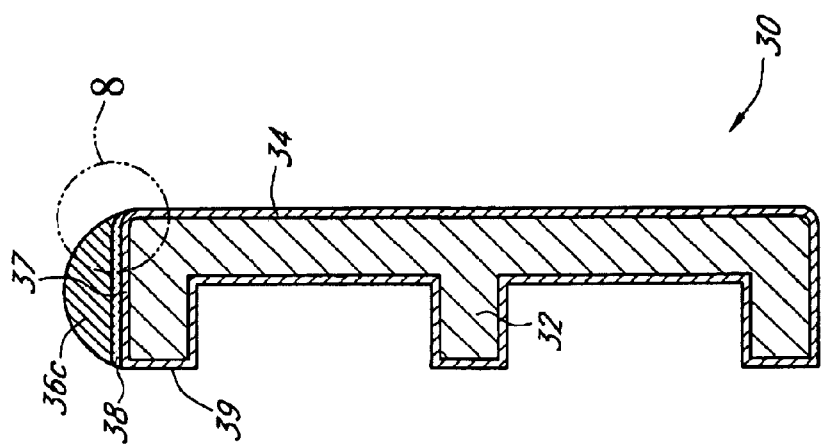
FIG. 7 is a detailed cross sectional view of the automotive grille of FIG. 4 showing the substrate having rounded edges.

The decorative members 30 are shown in detail in FIGS. 6–8. FIG. 6 shows a detailed cross-sectional view of a decorative member 30 having square edges in accordance with a preferred embodiment of the present invention. FIG. 7 shows a detailed cross-sectional view of a decorative member 30 having rounded edges in accordance with another preferred embodiment. FIG. 8 is a detailed view showing rounded edge 60. The rounded edges of the substrate at the decorative members also reduce the problem of the powder coating flaking off by reducing stress points, thereby ensuring the superior decorative finish of the automotive grille of the preferred embodiments of the present invention.

With reference back to FIGS. 2–5, the grille structure also preferably includes at least one elongate support 40 which extends vertically to connect the horizontally extending decorative members and to provide support for the grille structure 20. The elongate support member 40 provides rigidity to the grille structure 20, thereby improving the strength of the automotive grille.

The decorative members 30, support member 40, and mounting members 50 are preferably integrally joined to form the grille structure 20. The decorative members, elongate members, and support members are preferably welded together. Alternatively, the members may be molded to form the grille structure 20.

The decorative members 30, support member 40, and mounting members 50 are preferably integrally joined to form structure 20. The decorative members, elongate members, and support members are preferably welded together. Alternatively, the members may be molded to form structure 20.

The material of the structure is preferably metallic, and more preferably aluminum. It is envisioned that other materials as known to those skill in the art may be used such as other metals, high impact plastics and other similar materials may be used with the preferred embodiments of the present invention. The material should provide adequate strength to withstand impact without fracturing of the grille.

Exposed surfaces 36b, including the exposed surfaces of the decorative members 40, the elongate member 40, and the support members 50 are preferably covered with a protective coating material 34, which can be a powder coating 34. The powder coating 34 may be a black satin powder coating. See FIGS. 6 and 7. Alternatively, any of a number of other coating materials can be used as the protective coating material 34. For example, a wet paint can be applied or the substrate of the decorative members 30 can be anodized without departing from the spirit of the present invention. Preferably, the protective coating 34 uniformly coats the outer surface of the substrate 30 including the front face 37 thereof to inhibit rusting or oxidation of the substrate. As shown in FIG. 8, the interface between the front face 37 and an adjacent side face 39 is more uniformly covered by the protective coating 34 than if the front face 37 was polished and exposed. Hence, the tendency of the protective coating to flake off is reduced as there is fewer exposed areas where contaminants can oxidize the substrate of the decorative members 30 thereby causing the flaking of the protective layer.

A plurality of decorative weather resistant members 36c, dimensioned to match the front faces of the decorative members 30, are adhered to the front faces 37 of the decorative members 30 to substantially cover the front faces 37 to further inhibit oxidation of front faces 37 of the structure. In an alternative embodiment, at least one decorative resistant member 36c is adhered to the decorative members 30. The decorative weather resistant members 36c are preferably stainless steel, which is less prone to tarnishing. It is envisioned that other metallic materials that do not tarnish easily and have a desirable appearance for an extended period of time may be used with the preferred embodiments of the present invention. The decorative weather resistant members 36c are thin compared to the decorative member base 32, and preferably have a thickness of about 26 gauge when using stainless steel. The decorative weather resistant members 36c are preferably rolled on to the front face of the decorative members of the structure, and adhered to the front faces using a glue 38. The glue 38 is preferably an epoxy, and more preferably a liquid resin epoxy, such as Scotch Weld Part No. DP-190, available from 3M of Minneapolis, Minn. By adhering the decorative weather resistant members 36c, which provide the improved decorative finish of the grille, the coating material 34 is not removed. Since the coating material 34 is not removed, there are less exposed surfaces at which moisture can get beneath the coating, thereby reducing the risk of flaking off of the coating material or rusting.

Figure 10:
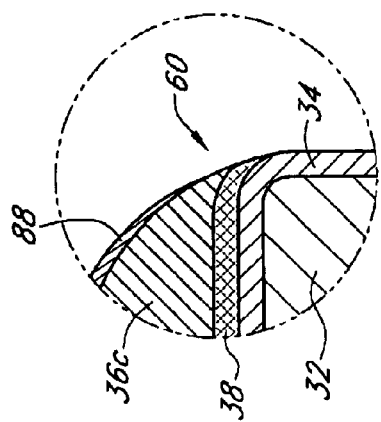
FIG. 10 is a detailed cross sectional view of the automotive grill of FIG. 9.
Figure 9:
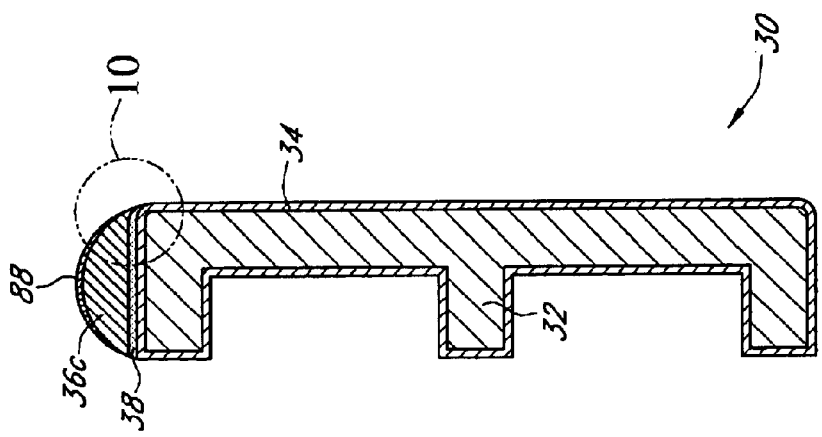
FIG. 9 is a detailed cross sectional view of the automotive grill of FIG. 7 showing an additional coating positioned on the substrate.

FIGS. 9 and 10 illustrate a second embodiment of the present invention. In this embodiment, the resistive members 36c are coated with a decorative coating 88 such as chrome plating. In one particular example, the resistive member 36c is comprised of a poly stainless steel and is chrome plated. The chrome plating 88 can also be extended to cover the entire substrate 20 to provide a chrome appearance.

In this implementation, the resistive members 36c do not have to be made of stainless steel but can be made of any of a number of other materials that have sufficient rigidity such that damage to the decorative members is reduced. Again, the coating interposed between the resistive members 36c and the substrate of the decorative members 30 is inhibited from flaking off in the manner described above.

Figure 11:
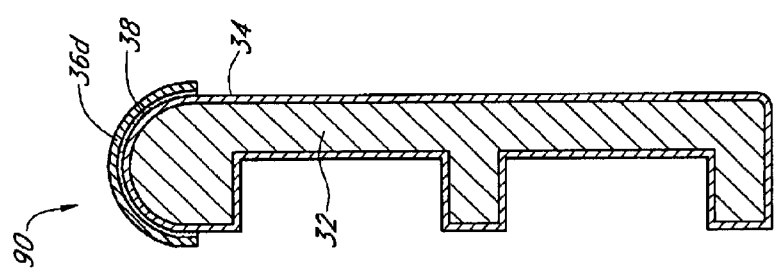
FIG. 11 is a detailed cross-sectional view of an automotive grill showing an alternative configuration.

FIG. 11 illustrates yet another example wherein the substrate 32 has a rounded front end 90 which includes the protective coating 34, such as a powder coating or other coatings as described above. A protective element 36d can be a thin layer of protective decorative material such as stainless steel that is shaped or otherwise contoured to match the contour of the rounded front end 90. A layer of adhesive 38 can then be used to adhere the decorative protective material to the substrate without removing the protective coating 34 in the same manner as described above.

In accordance with another preferred embodiment of the present invention, a method of making an automotive grille is provided. A substrate is formed having a first and a second side and dimensions adapted to be mounted to the front of a vehicle. The substrate may be formed by welding different elements or portions of the substrate together, wherein each of the elements may be molded or machined. Alternatively, the substrate may be molded or machined as a single element. The substrate includes a plurality of decorative members 30 defining a plurality of exposed surfaces and a plurality of front faces positioned adjacent the first side of the substrate. A plurality of mounting structures 50 are attached to the substrate on a second side opposite the first side, wherein the plurality of mounting structures 50 are adapted to secure the substrate to the vehicle. In certain preferred embodiments, the mounting structures 50 may be formed integrally with the substrate or may be attached to the substrate by welding. The exposed surfaces and the front faces of the substrate are coated with a coating material 34 to inhibit oxidation of the substrate. The coating material may be a powder coating, and more preferably a black satin powder coating. A plurality of decorative weather resistant members 36c, dimensioned to match the plurality of front faces of the plurality of decorative members 30 of the substrate, are adhered to the plurality of front faces to substantially cover the plurality of front faces to further inhibit oxidation of the plurality of faces of the substrate. The decorative weather resistant members are preferably adhered using an epoxy or similar adhesive substance 38.

The advantages of the automotive grille of the preferred embodiments of the present invention having a plurality of decorative weather resistant members adhered to the coated decorative members of the structure are reduction of the problem of moisture getting under the powder coating because there is no removal of the powder coat on the front edge of the structure. Moreover, stainless steel is less prone to tarnishing thereby resulting in a decorative grille having a desirable appearance for a longer period of time.

While a number of preferred embodiments of the invention and variations thereof have been described in detail, other modifications and methods of making the automotive grille will be apparent to those of skill in the art. Accordingly, it should be understood that various applications, modifications, and substitutions may be made of equivalents without departing from the spirit of the invention or the scope of the claims.

What is claimed is:

1. An automotive grille comprising:
  a substrate having a first and second side and dimensions adapted to be mounted to the front of a vehicle, wherein the substrate includes a plurality of decorative members defining a plurality of exposed surfaces and a plurality of front faces positioned adjacent the first side of the substrate wherein the exposed surfaces and the front faces are substantially coated with a coating material to inhibit oxidation of the substrate;
  a plurality of mounting structures attached to the substrate on a second side opposite the first side, wherein the plurality of mounting structures are adapted to secure the substrate to the vehicle; and
  at least one decorative weather resistant member dimensioned to match at least one of the front faces of the plurality of decorative members of the substrate wherein the at least one decorative weather resistant member is adhered to the at least one front face to substantially cover the at least one front face to further inhibit oxidation of the at least one front face of the substrate.

2. The grille of claim 1, wherein the substrate is formed of aluminum and the at least one decorative weather resistant member is formed of stainless steel.

3. The grille of claim 1, wherein the at least one decorative weather resistant member is adhered to the at least one front face using epoxy.

4. The grille of claim 3, wherein the epoxy is a liquid epoxy resin.

5. The grille of claim 1, wherein the coating material comprises a powder coat material.

6. The grille of claim 5, wherein the powder coat material is a black satin powder coating.

7. The grille of claim 1, wherein the front face of the decorative member is a horizontally extending elongate member.

8. The grille of claim 1, wherein the at least one decorative member comprises a plurality of decorative members.

9. The grille of claim 1, wherein the at least one decorative weather resistant member comprises a plurality of decorative weather resistant members.

10. The grille of claim 1, wherein the at least one decorative weather resistant member comprises a plurality of metallic strips.

11. An automotive grille comprising:
  a substrate having a first and second side and dimensions adapted to be mounted to the front of a vehicle, wherein the substrate includes a plurality of decorative members defining a plurality of exposed surfaces and a plurality of front faces positioned adjacent the first side of the substrate wherein the exposed surfaces and the front faces are substantially coated with a coating material to inhibit oxidation of the substrate;
  a plurality of mounting structures attached to the substrate on a second side opposite the first side, wherein the plurality of mounting structures are adapted to secure the substrate to the vehicle; and
  a plurality of decorative weather resistant members dimensioned to match a plurality of the front faces of the plurality of decorative members of the substrate wherein the plurality of decorative weather resistant members is adhered to the plurality of front faces to substantially cover the plurality of front faces to further inhibit oxidation of the plurality of front faces of the substrate.

12. A method of making a vehicle grille comprising:
  forming a substrate having a first and a second side and dimensions adapted to be mounted to the front of a vehicle, wherein the substrate includes a plurality of decorative members defining a plurality of exposed surfaces and a plurality of front faces positioned adjacent the first side of the substrate;
  attaching a plurality of mounting structures to the substrate on a second side opposite the first side, wherein the plurality of mounting structures are adapted to secure the substrate to the vehicle;
  coating the exposed surfaces of the substrate, decorative members, and mounting structures with a coating material to inhibit oxidation of the substrate; and adhering a plurality of decorative weather resistant members, dimensioned to match the plurality of front faces of the plurality of decorative members of the substrate, to the plurality of front faces to substantially cover the plurality of front faces to further inhibit oxidation of the plurality of faces of the substrate.

13. An automobile grill comprising:

a substrate defining a front face and a body;

a protective coating substantially the entire substrate including the front face such that the protective coating coats the interface between the front face of the substrate and the body of the substrate substantially continuously;

a decorative protective member that is adhered to the front face using an epoxy such that the decorative protective member is adhered to the protective coating so that the protective coating is not removed from the substrate to accommodate the decorative protective member.

14. The grill of claim 13, wherein the protective coating comprises a powder coating.

15. The grill of claim 13, wherein the protective coating comprises a chrome plating.

16. The grill of claim 13, wherein the decorative protective member comprises a protective member made of stainless steel having a shiny appearance.

17. The grill of claim 16, wherein the stainless steel protective member has a base that mates with the front face of the substrate and a radiused outer surface such that the stainless steel protective member has a rounded appearance.

18. The grill of claim 16, wherein the front face of the substrate has a rounded appearance and wherein the protective member comprises a sheet of stainless steel that is formed so as to match the rounded appearance of the front face of the substrate.

* * * * *